WILLIAM R. HALL
INVENTOR.

ATTORNEY

WILLIAM R. HALL
INVENTOR.

ATTORNEY

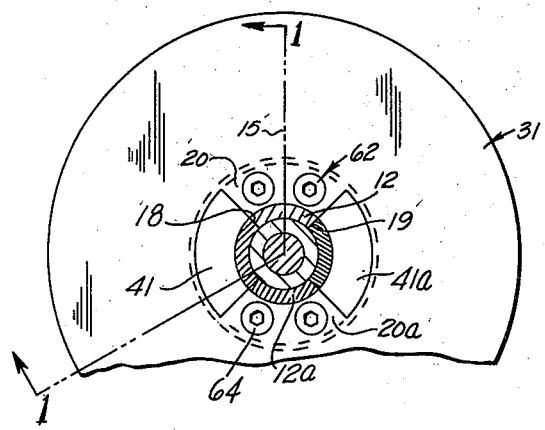
Fig. 3
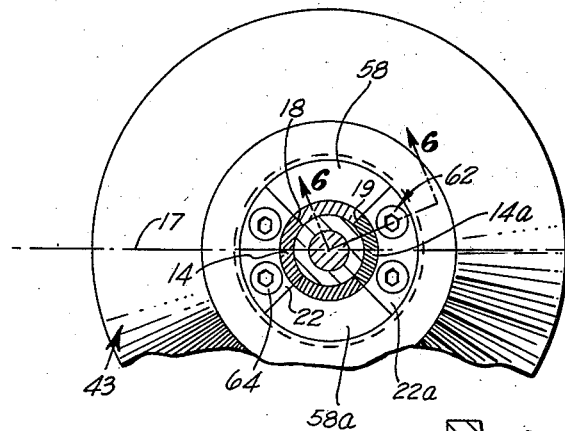
Fig. 4
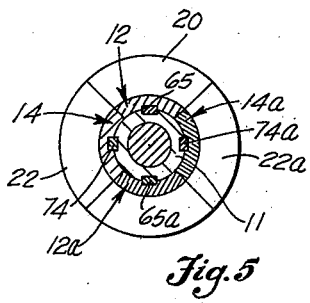
Fig. 5
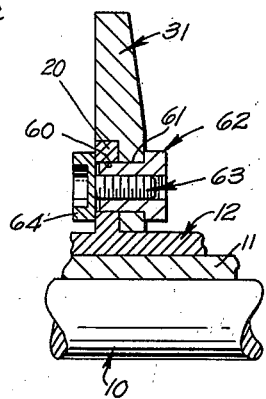
Fig. 6
WILLIAM R. HALL
INVENTOR.
ATTORNEY United States Patent Office 3,108,485
Patented Oct. 29, 1963

3,108,485
ADJUSTABLE MULTIPLE V-BELT PULLEY CONTROL MECHANISM WITH REMOVABLE PULLEY SECTIONS
William R. Hall, 288 Bay 38th St., Brooklyn 14, N.Y.
Filed Nov. 8, 1961, Ser. No. 150,911
12 Claims. (Cl. 74—230.17)

This invention relates to V-belt pulley drive and is particularly directed to an adjustable multiple V-belt pulley apparatus, which is mounted between the drive pulleys and the machine shaft pulleys in order to vary the speed range between the motor drive and the driven or machine mounted pulley.

It is particularly directed to a V-belt pulley mechanism in which the individual sections of each pulley are removable to enable a wide range of sizes of pulley sections to be used in conjunction with the same support and drive mechanism, so that the same pulley support hubs can be used with a wide range of pulley sizes.

This invention represents an improvement over U.S. Patent Number 2,953,033, issued September 20, 1960, to William R. Hall, the applicant of the present invention, on an "Adjustable Multiple V-Belt Pulley Control Mechanism."

A primary feature of applicant's apparatus is that the pitch diameter of the adjustable pulleys at the point at which they engage the respective V-belts is varied, while maintaining the center of the grooves between the angular surfaces of the cross-section of the V-belt in alignment with those of the drive and the machine shaft pulleys respectively, the individual pulley sections or halves being readily removable from the pulley support hubs, so that a wide range of pulleys can be used with the same support and control mechanism.

Another feature of the invention is that the sections forming the individual pulleys in the apparatus are readily individually removable and positively attached to their support hub so that the individual pulley sections are positively located and retained in their adjusted positions.

A major feature of the invention is that individual sections forming each pulley can readily be replaced, thus obtaining a wide range of pitch diameters to suit the requirements of the individual application.

Another feature is that the individual pulley sections are removably attached to the hub sections by precision attaching means to facilitate replacement of the individual sections of the pulley without disturbing the other pulleys in the apparatus.

Another feature is that the section of each pulley may be progressively individually attached to the support and drive-hubs without disturbing the other pulleys in the drive mechanism.

A major feature of the construction is that each pulley section is accurately centered relative to the corresponding support hubs, and accurately held in place to ensure accurate support and ready interchangeability regardless of the diameter of the individual pulley sections.

Another feature is that the pulley section support holes in the individual pulley sections and the corresponding pulley support hub sections, are accurately aligned with one another to facilitate insertion and removal of the dowel bushings and attaching screws used to attach the individual pulley sections to the corresponding hub sections.

Another feature of the apparatus is that after the individual pulley sections are attached to their respective hub sections, the diameters of the various adjustable pulley sections can be changed and the speed adjustments made while the machine is running without otherwise affecting the operation of the machine or the motor driving it in any manner.

Another feature of the construction is that above a minimum diameter, below which solid pulleys are used, the range of pulley diameters, and the steps in the diameters thereof are limited only by practical manufacturing limitations.

A major feature of the apparatus is that each individual pulley section is attached to the mating hub section by a precision shouldered dowel bushing, with an accurately centered screw threadably fitted to the dowel bushing to positively and accurately support each pulley section on the corresponding hub sections.

The accompanying drawings, illustrative of one embodiment of my invention, together with the description of their construction and the method of operation, regulation and utilization thereof, will serve to clarify further objects and advantages of my invention.

In the drawings:

FIGURE 3 is a cross-section through the shaft and pulley shown in FIG. 1, showing the contour of the pulley section support hubs and the pulley sections attached thereto, also the method of attaching the pulley section to the adjacent portion of the pulley hub sections, the section being taken on the line 3—3, FIG. 1.

FIGURE 4 is a cross-section, similar to FIG. 3, through another portion of the shaft and pulley support hubs, showing the contour of the pulley section support hubs and the inner contour of the pulley sections attached thereto, also the method of attaching the pulley hub sections to the support hub sections, the section being taken on the line 4—4, FIG. 1.

FIGURE 5 is a cross-section through the shaft, the pulley section support hubs, and the tubular support therefor, showing the method of keying the pulley support hubs to the tubular support member, the section being taken on the line 5—5, FIG. 1.

FIGURE 6 is a longitudinal section through one of the pulley sections, and the support hub to which it is attached, as shown in FIGS. 1, 3 and 4, showing the method of attaching the pulley section to the pulley support hub section, the section being taken on the line 6—6, FIG. 4.

Figure 1:
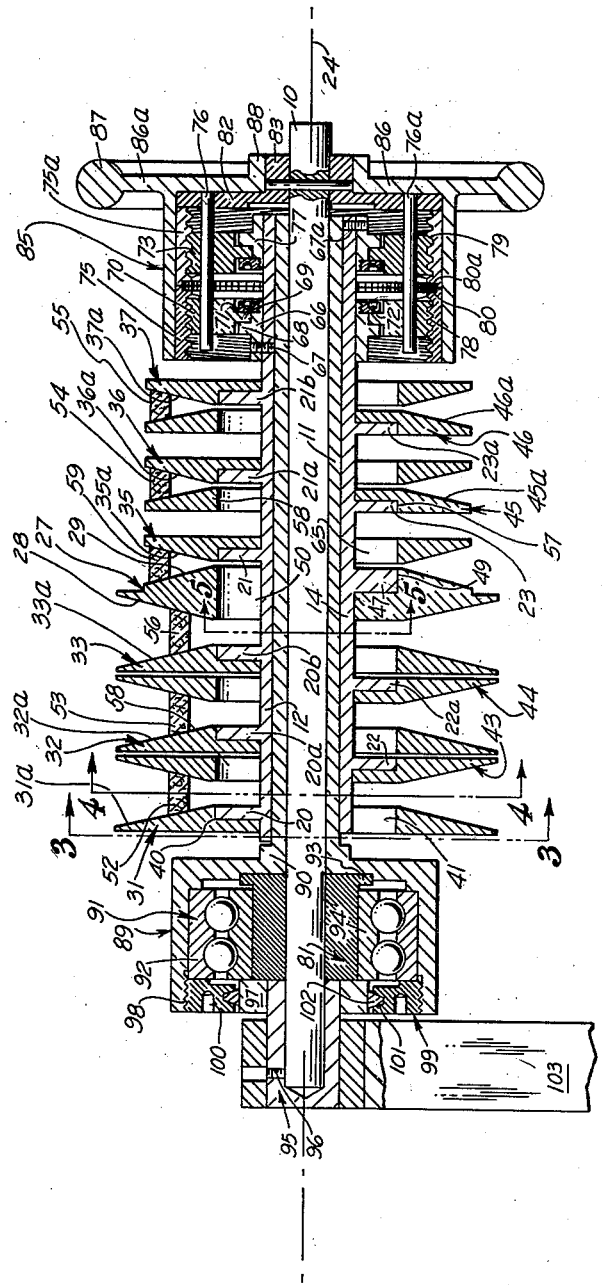
FIGURE 1 is a vertical section through one embodiment of the multiple V-belt control mechanism, showing the method of attaching the removable pulley sections to the corresponding hub sections, also the control mechanism therefor, the pulley sections being shown in one adjusted position, as indicated by the position of the V-belt sections, the section being taken on the line 1—1, FIG. 3.

It will be understood that the following description of the construction and the method of control, attachment, operation and utilization of the "adjustable multiple V-belt pulley control mechanism with removable pulley sections" is intended as explanatory of the invention and not restrictive thereof.

In the drawings, the same reference numerals designate the same parts throughout the various views, except where otherwise indicated.

One embodiment of the construction shown in FIGS. 1, 2, 3 and 4 is supported by a central substantially cylindrical fixed shaft 10, a tubular pulley hub support member 11 surrounding the central shaft. The pulley section support hubs 12 and 14 are formed in two pairs of sections, including the first pair of hub sections 12, 12a which are diametrically aligned with one another, located on a substantially vertical axis 15, as shown in FIG. 3, and the second pair of hub sections 14, 14a, which are similarly diametrically aligned with one another on a substantially horizontal axis 17, as shown in FIG. 4.

As shown in FIGS. 3 and 4, the dividing edges 18, 19, between adjoining sections 12, 14 of the pulley support hubs, are located at an angle of approximately 45° relative to the vertical axis 15.

Figure 2:
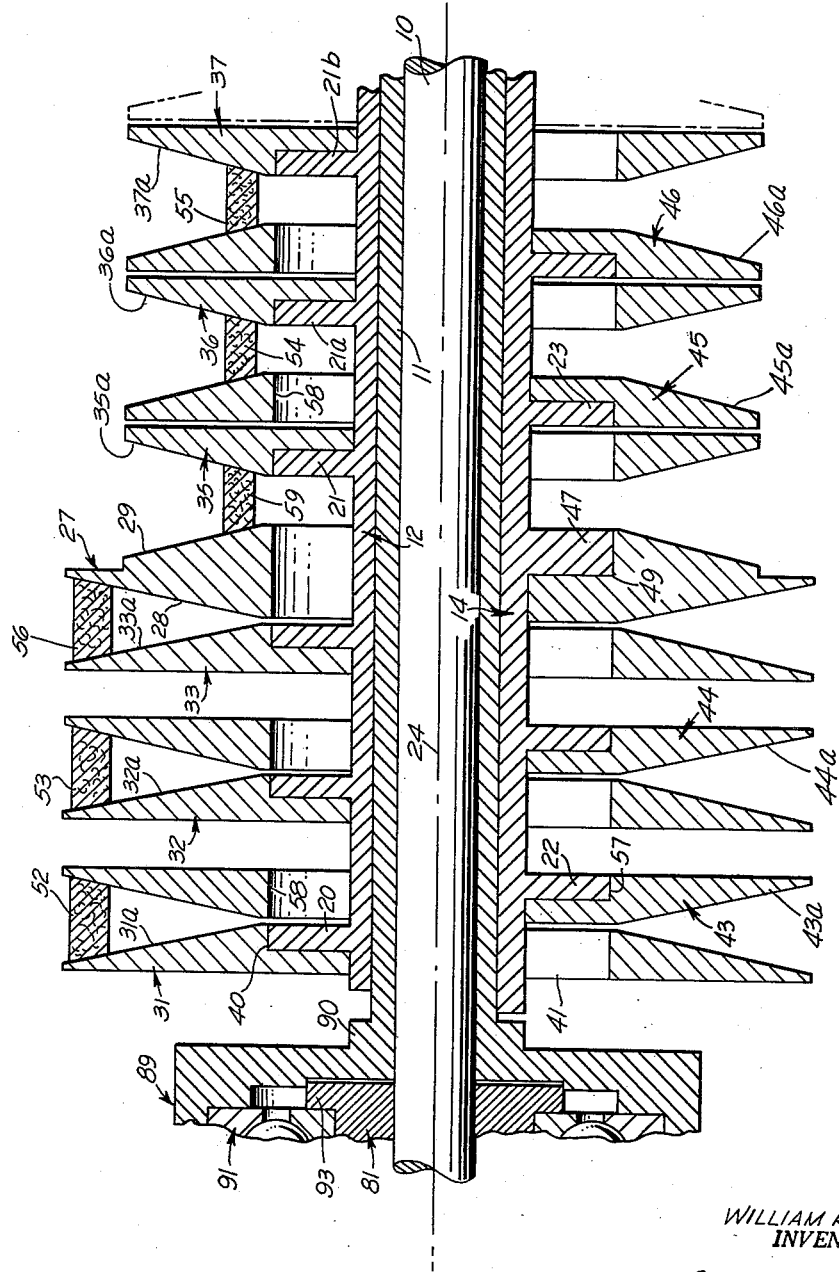
FIGURE 2 is a vertical section, similar to FIG. 1, through the pulley support and control mechanism, shown in FIG. 1, with the pulley sections moved to an adjusted position, the effective diameter of the left-hand group of pulley sections being increased, the effective diameter of the right-hand pulley sections being reduced.

As shown in FIGS. 1 and 2, each of the hub sections 12 and 14 has a flange 20, 21, 22, 23, integral therewith, each flange being substantially perpendicular to the longitudinal axis 24 of the hub sections, as shown in FIG. 1, each flange being of circular segmental form, the edges of each flange being aligned with and continuations of the angular dividing edges 18, 19, between the hub sections, as shown in FIGS. 3 and 4.

As shown in FIGS. 1 and 2, three pairs of pulley sections are located adjacent the outer end of the hub sections, left-hand, FIGS. 1 and 2, and three corresponding pairs of pulley sections being located at the opposite end of the hub sections 12, 14, adjacent the control mechanism shown in FIG. 1.

The two groups of pairs of pulley sections are separated by a central pulley section 27, which has a pair of oppositely sloping frusto-conical sloping faces 28, 29 integral therewith. One of the sloping faces 28, of the central pulley section, functions with the left-hand group of pulley sections, the opposite sloping face 29 of the central pulley section, functioning with the right-hand group of pairs of pulley sections, as shown in FIGS. 1 and 2.

As shown in FIGS. 1 and 2, the left-hand group of pairs of pulley sections includes three pulley sections 31, 32, 33, which are attached to the left-hand flanges 20, 20a, 20b, of the first or vertical hub sections 12, 12a.

The right-hand group of pairs of pulley sections includes three pulley sections 35, 36, 37 which are attached to the right-hand flanges 21, 21a, 21b, of the first or vertical hub sections 12, 12a, as shown in FIGS. 1 and 2.

As shown in FIGS. 1 and 2, each of the left-hand pulley sections 31, 32, 33 has a sloping frusto-conical face 31a, 32a, 33a integral with the right-hand face thereof.

Similarly, each of the right-hand pulley sections 35, 36, 37, which are also attached to the flanges of the first pair of hub sections, has a similar oppositely sloping frusto-conical face 35a, 36a, 37a, at the left-hand face thereof.

As shown in FIGS. 1 and 2, each of the left-hand pulley sections 31, 32, 33 has a circular segmental counterbore 40 therein, adjacent the sloping face thereof, the counterbore 40 serving as a pilot to center each pulley section 31, 32, 33 about the flanges 20, 20a of the first pair of hub sections 12, 12a.

The portion of the wall of the inner portion of each pulley section, which is aligned with the flanges 22, 23 of the second pair of hub sections, is cutout 41, 41a, as shown in FIGS. 1 and 3, the cutouts, the sloping edges of which are aligned with the angularly positioned dividing edges 18, 19 between the first and second pairs of the hub sections 12, 14 to clear the flanges 22, 23, of the second pair of hub sections 14, 14a when the pulley sections 43, 44, are assembled with the hub sections 14, 14a and attached thereto, in a manner hereinafter described.

Similarly, the left-hand group of pulley sections includes two pulley sections 43, 44, which are attached to the left-hand flanges 22, 22a of the second pair of hub sections 14, 14a, located on the horizontal axis 17, shown in FIG. 4.

The right-hand group of pairs of pulley sections also includes two pulley sections 45, 46, which are attached to the right-hand flanges 23, 23a of the second pair of hub sections, as shown in FIGS. 1 and 2.

The central pulley section, which has a pair of oppositely sloping frusto-conical pulley faces 28, 29 formed thereon, is attached to the flanges 47, 47a of the second pair of hub sections, which are located in substantial alignment with and follow the circular segmental contour of the other flanges 22, 22a of the second pair of hub sections 14, 14a, as shown in FIG. 3.

As the central pulley section 27 is thicker than the other pulley sections 33, 35, as shown in FIGS. 1 and 2, the flanges 47, 47a, which support the central pulley section, are thicker than the flanges of the hub sections, which support the individual pulley sections, as shown in FIGS. 1 and 2.

As shown in FIGS. 1 and 2, the central pulley section has a circular segmental counterbore 49 therein, adjacent one of the frusto-conical sloping faces thereof, the counterbore serving as a pilot to center the central pulley section about the central flanges 47, 47a of the second pair of hub sections 14, 14a.

The counterbore 49 is deeper than the counterbores 40 in the pulley sections 31, 32 to accommodate the thicker flanges 22, 22a of the second pair of hub sections 14, 14a.

As shown in FIGS. 1 and 2, the portion of the inner portion of the wall of the central pulley section 27, which is aligned with the flanges 20, 20a of the first pair of hub sections 12, 12a is cutout 50, in a manner similar to that shown in FIG. 3, the cutouts, the sloping edges of which are aligned with the angularly positioned dividing edges 18, 19 between the first and second pairs of hub sections, with the outer diameter of the cutout 50 being slightly larger than the outer diameter of the flanges 20, 20a of the first pair of hub sections, to clear the flanges 20, 20a of the first pair of hub sections, thereby to allow the central pulley sections to be moved longitudinally along the hub sections to the assembled position shown in FIGS. 1 and 2, and attached to the mating flanges of the second pair of hub sections, in a manner hereinbefore described.

As shown in FIGS. 1 and 2, each of the left-hand pulley sections 43, 44 has a sloping frusto-conical face 43a, 44a integral with the left-hand face thereof. The sloping frusto conical faces 43a, 44a of the pulley sections 43, 44, are opposite those of the adjoining pulley sections 31, 32, thus forming a V-groove between each pair of pulley sections, each V-groove supporting a V-belt 52, 53 in either the position shown in FIG. 1, or the adjusted position shown in FIG. 2, depending upon the longitudinal position of the two pair of hub sections 12, 14.

Similarly, each of the right-hand pulley sections 45, 46, which are also attached to the second pair of hub sections 14, 14a, has a similar oppositely sloping frusto-conical face 45a, 46a at the right-hand face thereof.

The sloping frusto-conical faces 45a, 46a of the pulley sections 45, 46 are opposite those of the adjoining pulley sections 36, 37, thus forming a V-groove between each pair of pulley sections 45, 36, each V-groove supporting a V-belt 54, 55 in either the outer position shown in FIG. 1, or in the adjusted reduced diameter position, shown in FIG. 2, depending upon the adjusted longitudinal position of the two pair of hub sections 12, 14.

Similarly, the frusto-conical left-hand face 28 of the central pulley section 27 combines with the corresponding frusto-conical face 33a of the adjoining pulley section 33 to form a V-groove which receives a V-belt 56, in the outer position shown in FIG. 2, or the reduced diameter position, shown in FIG. 1.

In the same manner, the frusto-conical right-hand face 29 of the central pulley section combines with the corresponding frusto-conical face 35a of the adjoining right-hand pulley section 35, to form a V-groove which receives a V-belt 59 in the outer position, shown in FIG. 1, or the reduced diameter position, shown in FIG. 2.

As shown in FIGS. 1 and 2, each of the left-hand pulley sections 43, 44 has a circular counterbore 57, through one face thereof, adjacent the flat face of the pulley section, the counterbore 57 serving as a pilot to center each pulley sections 43, 44 about the flanges 22, 22a of the second pair of hub sections 14, 14a in the same manner as those attached to the first pair of hub sections.

The portion of the wall of the inner portion of each pulley section 43, 44, which is aligned with the flanges 20, 20a of the first pair of hub sections 12, 12a, is cutout 58, as shown in FIG. 4, the cutouts following the contour of the flanges 20, 20a of the first pair of hub sections 12, 12a, to clear the flanges of the first pair of hub sections, when the pulley sections 43, 44 are moved to the assembly position, after which they are assembled to the flanges of the hub sections 12, 12a and attached thereto in a manner hereinafter described.

As shown in FIG. 3, each of the flanges 20, 20a of the first pair of hub sections 12, 12a has a pair of radially positioned circular openings 60 therethrough, each pulley section 31, 32, 33, which is attached to the flanges 20, 20a having a pair of corresponding axially aligned openings 61 therethrough.

As shown in FIG. 6, a tubular internally threaded dowel bushing 62, having a head integral therewith, is inserted through each of the openings 60, 61, a screw 63, having a hollow hexagon or other type of head 64 integral therewith being threadably fitted to each of the dowel bushings 62, the screw and dowel bushing combination being operative to clamp the pulley sections 31, 32, 33 to the flanges 20, 20a of the corresponding hub sections 12, 12a.

The openings 61, through each of the pulley sections 31, 32, 33, and the aligned openings 60, through the flanges of the hub sections 12, 12a, as well as the external diameter of the tubular dowel bushings 62, are accurately machined and fitted to one another, to accurately align the pulley sections 31, 32, 33 with the corresponding flanges of the hub sections, thereby accurately fitting the pulley sections to the hub sections.

As shown in FIG. 4, each of the flanges 22, 23 of the second pair of hub sections has a corresponding pair of substantially circular openings therethough, each pulley section 43, 44, which is attached to the flanges 22, 22a of the second pair of hub sections 43, 44, having a pair of openings therethrough, which are axially aligned with the openings through each of the flanges of the hub sections.

The bushings 62 and the screws 63, which attach the pulley sections 43, 44, to the second pair of hub sections are substantially the same as those shown in FIG. 6, the pulley sections 43, 45 being attached to the second pair of hub sections 14, 14a in substantially the same manner as that hereinbefore described.

In order to attach one of the pulley sections 31, 32, 33 to the first pair of hub sections 12, 12a, the pulley section 31 is first rotated into a position in which the cutouts 41, 41a therethrough clear the flanges 20, 20a of the first pair of hub sections 12, 12a, after which the pulley section is slid along around the outer diameter of the flanges 20, 20a. When the pulley section 31 reaches one of the flanges 22, 22a of the second pair of hub sections, which is located in the position shown in FIG. 4, displaced through an angle of 90° from the flanges 20, 20a of the first pair of hub sections, the pulley section is rotated through an angle of 90°, the cutouts 41, 41a through the wall of each pulley section clearing the flanges 22, 22a of the second pair of hub sections 14, 14a.

Each of the pulley sections 43, 45 attached to the second pair of hub sections 14, 14a is similarly rotated into a position in which the cutouts 58, 58a through the pulley section are aligned with the flanges 22, 22a of the second pair of hub sections 14, 14a, each pulley section being slid along the flanges 22, 22a of the second pair of hub sections in the same manner as that hereinbefore described, the pulley sections 43, 45 being rotated through an angle of 90° until the cutouts 58, 58a through the wall of each pulley section clear the flanges 20, 20a of the first pair of hub sections, this procedure continuing until each pulley section, such as 44, reaches the corresponding pair of hub sections to which it is to be attached. After the pulley section 44 reaches the corresponding flanges of the second hub section to which it is to be attached, the pulley section 44 is rotated into a position in which the openings therethrough are aligned with the openings 60 through the flanges of the hub sections. The dowel bushings 62 are inserted through the openings in the flanges and the pulley sections respectively, each of the screws 63, being inserted into the internally threaded opening in the dowel bushing and the screw tightened against the face of the pulley section 44, or the face of the flange 22a by a long hollow hex wrench.

The pulley sections 43, 44, 45 at the left-hand side of FIGS. 1 and 2, and the central pulley section 27, attached to the flanges of the second pair of pulley sections 14, 14a are attached to the respective flanges of the second pair of hub sections.

This pulley section assembly operation is performed before the central cylindrical shaft and the hub support member are fitted to the bearings and the bearing support housing shown at the left-hand side of FIGS. 1 and 2, thus providing space for each of the pulley sections to be moved longitudinally and rotated into its assembly position, and the socket head screws 64, to be inserted into the respectively internally threaded openings in the dowel bushings 62.

The pulley sections 35, 36, 37 at the right-hand side of FIGS. 1 and 2 are moved into the assembly position shown in FIGS. 1 and 2, in substantially the same manner as that hereinbefore described.

This operation is performed before the central shaft 10, the hub support member and the hub sections 12, 14 are assembled with the control mechanism, shown at the right-hand side of FIGS. 1 and 2.

The pulley sections 31, 32, 36 attached to the first pair of hub sections 12, 12a are individually rotated into a position, such as that shown in FIG. 4, in which the cutouts 41, 41a through the wall of each pulley section clear and pass the outer circumference of the flanges 20, 20a of the first pair of hub sections 12, 12a, the individual pulley sections are rotated through 90° until they reach substantially the position shown in FIG. 3, in which position the cutouts through the wall of each pulley section pass and clear the flanges 22, 22a of the second pair of hub sections.

After each pulley section, such as 43, reaches the attaching position relative to the flanges of the hub sections shown in FIGS. 1 and 2, the pulleys sections are attached to the respective flanges, in substantially the manner shown in FIG. 6.

The right-hand pulley sections 45, 46 attached to the second pair of hub sections are moved into the respective positions shown in FIGS. 1 and 2, the pulley sections being progressively rotated and slid along longitudinally until they progressively clear the flanges of the second pair of hub sections, and the flanges of the first pair of hub sections, until each pulley section reaches the attaching position relative to the flanges of the second pair of hub sections 14, 14a, shown in FIGS. 1 and 2, after which the individual pulley sections are attached to the corresponding flanges of the second pair of hub sections, in the manner shown in FIG. 6, and hereinbefore described.

FIG. 5 is a cross-section through the pulley support hub sections 12, 14 and the tubular pulley hub support member 11, which is fitted to the interior of the pulley support hub sections 12, 14 as shown in FIGS. 1, 2, 3 and 4.

Each of the first pair of pulley support hub sections 12, 12a shown in FIG. 5 has a substantially rectangular keyway through the inner daimeter thereof, a mating pair of diametrically aligned rectangular keyways being cut around the outer circumference of the tubular pulley hub support member 11 shown in FIG. 5.

A pair of diametrically aligned keys 65, 65a of substantially rectangular cross-section is fitted to each pair of keyways, cut into the pulley hub sections 12, 12a and in the corresponding radial positions in the tubular pulley hub support member 11, as shown in FIG. 5.

Each of the second pair of pulley support hub sections 14, 14a has a similar keyway, through the inner diameter thereof, a mating pair of keyways being cut through the outer diameter of the tubular hub support member 11 along a substantially horizontal axis, as shown in FIG. 5.

A pair of diametrically aligned keys 74, 74a, similar to those fitted to the vertical axis, is fitted to each pair of keyways cut into the pulley hub sections 14, 14a, and the corresponding radial positions along the horizontal axis, of the pulley hub support member 11, as shown in FIG. 5.

The keys 65, 65a enable the first pair of pulley support hub sections 12, 12a to be moved in a direction substantially parallel to the longitudinal axis 24 of the pulley support hub sections 12, 12a from the longitudinal position shown in FIG. 1, to the adjusted position shown in FIG. 2, or any other longitudinal position within the range of the control mechanism, shown at the right-hand side of FIG. 1, and hereinafter described, while retaining the radial arrangement between the pulley hub sections, and the tubular hub support member 11.

Similarly the keys 74, 74a, located on the horizontal axis of FIG. 5, enable the second pair of pulley hub sections 14, 14a to be moved longitudinally from the longitudinal position shown in FIG. 1, to the adjusted longitudinal position shown in FIG. 2, or any other adjusted longitudinal position of the second pair of pulley hub sections 14, 14a within the range of the control mechanism, shown in FIG. 1, and hereinafter described.

The control mechanism, which is used for controlling the relative longitudinal movement of the first pair of pulley support hub sections 12, 12a, and the pulley sections attached thereto, and the second pair of pulley support hub sections 14, 14a and the pulley sections attached thereto, is shown in FIG. 1.

This is substantially the same as the control mechanism shown in applicant's prior Patent Number 2,953,033, hereinbefore referred to.

A substantially tubular shouldered collar 66 is attached to the first pair of hub sections 12, 12a by a plurality of set screws 67, or other suitable attaching means, as shown in FIG. 1.

The outer portion of the collar 66 has a substantially circular flange 68 integral therewith, the flange engaging one face of the internal flange 69, of an externally threaded sleeve or spider 70, which surrounds the collar 66, in the position shown in FIG. 1. The internal flange of the sleeve 70 is held against the collar 66, by a substantially circular internally threaded lock nut 71, which is threadably fitted to the externally threaded reduced diameter central portion of the collar. The lock nut 71 is rotated into the clamping position by a plurality of pairs of diametrically opposite spanner holes 72, to which a spanner wrench (not shown) is fitted.

The externally threaded sleeve 70 and the mating sleeve 73, which is located at the opposite end of an internally threaded control member 75, 75a, in which the sleeves 70, 73 are mounted, are slidably supported by a plurality of radially positioned cylindrical pins 76, 76a, which are substantially parallel to the longitudinal axis 24 of the central shaft 10, and located radially therefrom.

A mating shouldered collar 77 is fixedly attached to the second pair of hub sections 14, 14a by a plurality of set screws 67a, which are threadably inserted in the hub sections, the set screws causing the diametrically aligned pair of hub sections 14, 14a to move longitudinally in unison, the collar 76 being located adjacent the inner edge of the second pair of pulley support hub sections 14, 14a. The externally threaded sleeve 73, is rotatably supported against the outer flange of the collar 77 in the same manner as the outer sleeve 70, a lock nut 71, being provided to grip the inner flange of the externally threaded sleeve 73, in the same manner as that hereinbefore described.

A substantially tubular control member which is formed in two sections, a left-hand section 75, and a right-hand section 75a, surrounds the two externally threaded sleeves 70, 73.

The left-hand section 75 of the control member has right-hand Acme, or other form of internal threads 78 formed therein, conforming to the right-hand external threads of the left-hand sleeve 70. The right-hand section 75a, of the tubular control member has the same type of left-hand internal threads 79 therein, conforming to the form and contour of the left-hand external threads on the right-hand sleeve 73.

A pair of central recesses 80, 80a is formed at the inner junction at the ends of the two sections 75, 75a of the tubular control member, the central recesses being of larger diameter than the outer diameter of the threads 78, 79, thereby serving to separate the left- and right-hand internal threads.

The left-hand sleeve 70 is externally threaded, the right-hand external threads being threadably fitted to the mating internal threads 78 in the left-hand section 75 of the tubular control member. Similarly, the right-hand sleeve 73 has left-hand external threads around the outer circumference thereof, the threads being fitted to the left-hand internal threads 79 formed in the right-hand section 75a of the tubular control member.

A fixed flat circular plate 82, having a central hub 83 fitted to the central shaft, is mounted adjacent the right-hand end of the right-hand section 75a of the tubular control member, the plate 82 abutting the right-hand wall 84 of the hollow cylindrical drum 85, into which the control member is fitted.

The circumferential outer wall of the hollow cylindrical drum 85 is fixedly attached to the two sections 75, 75a, of the tubular control member by a plurality of set screws, or other suitable attaching means, one set of set screws being inserted in the left-hand section 75 of the control member, the other set of set screws, or other attaching means, being inserted in the right-hand section 75a of the tubular control member.

After insertion, in and attachment to the circumferential outer wall of the hollow cylindrical drum 85, the two sections 75, 75a of the control member function substantially as a single unit, as both sections of the control member are attached to the hollow cylindrical drum.

The cylindrical pins 76, 76a which slidably support the externally threaded sleeves 75, 75a are pressed into, threadably attached to, or otherwise attached to the circular plate 82, the pins preventing rotation of the externally threaded sleeves 70 and 73 when the tubular control member 75, 75a is rotated.

The rear wall (right-hand) of the hollow cylindrical drum 85 has an annular extension 86a integral therewith, a rim 87 of substantially circular cross-section, integral with the extension of the rear wall 86 being provided to enable the operator to manually rotate the hollow cylindrical drum 85.

A tubular hub 88 is integral with the rear wall 86 of the hollow cylindrical drum 85, the hub 88 surrounding the outer hub 83, of the circular plate 82.

As shown in FIG. 1, a hollow cylindrical housing 89 is mounted adjacent the left-hand end of the central fixed shaft 10, the housing having a tubular hub 90 integral with the right-hand wall thereof, the tubular hub being rotatably supported by the central cylindrical shaft 10.

As shown in FIG. 1, the hollow cylindrical housing 89 and the tubular hub 90 integral therewith are integral with the tubular hub support member 11, which extends along substantially the entire length of the pulley control mechanism shown in FIG. 1. This enables the housing 89 and the outer race 92 of the bearing 91 to rotate, while the central shaft 10 is relatively fixed.

A double-row ball bearing 91 or other type of anti-friction bearing is fitted to the extension of the hollow cylindrical housing 89, the outer race 92 of the bearing being pressed into the outer wall of the hollow cylindrical housing 89.

A tubular sleeve 81, having a flange 93 integral with the right-hand end thereof, is pressed on, or otherwise attached to the central cylindrical shaft 10, the flange 93 being fitted to a counterbore in the right-hand wall of the hollow cylindrical housing 89. The inner race 94 of the anti-friction bearing 91 is pressed on, or otherwise attached to the outer circumference of the tubular sleeve 81.

A cupped cylindrical collar 95 is attached to the left-hand end of the cylindrical shaft 10, a set-screw 96, or other type of locking means, being provided to lock the collar on the end of the shaft 10. The right-hand end of the collar 95 engages the left-hand end of the sleeve 81, which supports the inner race of the ball bearing 91.

A tubular sleeve 97, attached to the outer diameter of the collar 95, abuts the left-hand edge of the inner race 94 of the anti-friction bearing 91, thus locating the inner race 94 of the bearing longitudinally, relative to the central shaft 10.

The open end of the hollow cylindrical housing 89 is internally threaded 98, a tubular lock nut 99 being threadably fitted to the internal threads 98 in the hollow cylindrical housing, the lock-nut having a plurality of diametrically aligned spanner holes 100 therein, the holes being adapted to receive a spanner wrench (not shown) to rotate the lock-nut.

As shown at the left-hand side of FIG. 1, a long arm 103, having an opening through the upper end thereof, is fixedly attached to the outer circumference of the cylindrical collar 95, the arm thus supporting the fixed central shaft, and therefore the assembled pulley control mechanism shown in FIG. 1.

This arm 103 which is angularly positioned relative to the vertical axis of the pulley control mechanism is substantially the same as that shown in applicant's Patent Number 2,953,033, the opposite end of the arm 103 being pivotally supported by a bracket, thus allowing the arm to be angularly displaced about the pivot, thereby providing an adjustment for the belt lengths, regardless of the position of the various pairs of pulley sections.

An angular groove 101 of trapezoidal cross-section is cut into the interior of the lock nut 99, a packing gland 102, of mating trapezoidal cross-section, being fitted to the groove 101 to provide an oil seal for the anti-friction bearing.

The lock nut 99 has an annular shoulder integral with the right-hand end thereof, the annular shoulder engaging the outer race 92 of the bearing to lock the outer race of the bearing between the shoulder, and a mating shoulder integral with the right-hand wall of the hollow cylindrical housing 89.

The adjustment of the pulley V-groove diameters is accomplished in the following manner, as shown in FIGS. 1 and 2.

When the hollow cylindrical drum 85 with the two sections 75, 75a of the tubular control member attached thereto, is rotated in a direction toward the plane in which section 1—1 is taken, the right-hand threads 78 in the tubular sleeve section 75 at the open or left-hand end of the hollow cylindrical drum move the left-hand tubular sleeve 75 toward the pulley section 37, left-hand, the left-hand internal threads 79 in the inner or right-hand section 75 of the tubular control member simultaneously moving the right-hand sleeve 75a rightward toward the outer wall 84 right-hand, of the hollow cylindrical drum 85.

The first pair of pulley support hub sections, which are attached to the left-hand flanged collar 66, is moved leftward toward the pulley section 37, the left-hand group of the pulley sections 31, 32, 33, which are attached to the first pair of hub sections 12, 12a and the right-hand pulley sections 35, 36, which are also attached to the first pair of hub sections, are moved leftward from the position shown in FIG. 2, to the position shown in FIG. 1.

Simultaneously, the second pair of pulley support hub sections, which are attached to the right-hand flanged collar, is moved rightward toward the hollow cylindrical drum 85, the left-hand group of pulley sections 43, 44, which are attached to the second pair of hub sections 14, 14a, is moved rightward from the position shown in FIG. 2 to the V-groove widened position shown in FIG. 1. The right-hand pulley sections 45, 46, which are also attached to the second pair of hub sections 14, 14a, are also moved rightward from the position shown in FIG. 2, to the narrow V-groove position shown in FIG. 1.

The central pulley section 27, which is also attached to the second pair of hub sections 14, 14a, is also moved rightward from the position shown in FIG. 2, to the positions shown in FIG. 1.

This increases the width of the V-groove formed at the left-hand side of the central pulley section, thereby reducing the effective diameter of the V-groove, the V-belt 56 moving from the outer position shown in FIG. 2, to the reduced diameter position shown in FIG. 1.

Simultaneously, the width of the V-groove at the right-hand side of the central pulley section 27 is reduced, from the position shown in FIG. 2, to that shown in FIG. 1, thereby increasing the effective diameter of the V-groove at the right-hand side of the central pulley section 27, the V-belt 59 being moved from the reduced diameter position shown in FIG. 2, to the increased diameter position shown in FIG. 1.

When the hollow cylindrical drum 85, with the sections 75, 75a of the tubular control member attached thereto, is rotated in the reverse direction, the threads in the tubular sleeve 70 at the left-hand end of the hollow cylindrical drum move the left-hand sleeve 70 toward the right, the threads of the right-hand section of the tubular control member 75a, simultaneously moving the right-hand sleeve leftward toward the open end of the hollow cylindrical drum 85.

The first pair of pulley support hub sections 12, 12a attached to the left-hand flanged collar 66 is moved rightward toward the hollow cylindrical drum 85, the left-hand group of pulley sections 31, 32, 33 attached to the first pair of hub sections and the right-hand pulley sections 35 and 36, which are also attached to the first pair of hub sections being moved rightward from the position shown in FIG. 1 to the position shown in FIG. 2.

Simultaneously, the second pair of pulley support hubs 14, 14a which are attached to the right-hand flanged collar 77 is moved leftward toward the pulley sections, the left-hand group of pulley sections 43, 44, the right-hand pulley sections 45, 46, and the central pulley section 27, all of which are attached to the second pair of pulley support hub sections 14, 14a, being moved leftward from the position shown in FIG. 1, to the position shown in FIG. 2.

This reduces the width of the left-hand V-grooves, and increases the diameter thereof, the left-hand V-belts 52, 53, 56 being moved from the position shown in FIG. 1, to the increased diameter position shown in FIG. 2.

The movement of the second pair of hub sections and the corresponding movement of the pulley sections reduces the diameter of the right-hand V-grooves from the position shown in FIG. 1, to the position shown in FIG. 2, the V-belts 59, 54, 55, fitted to these V-grooves, being moved from the outer position shown in FIG. 1, to the reduced diameter position shown in FIG. 2.

While three pulley sections are shown attached to the first pair of hub sections at the left-hand side of the central pulley section 27, and three pulley sections attached to the first pair of hub sections at the right-hand side of the central pulley section 27, this number may be increased or decreased, depending upon the requirements of a particular installation, the total number of pulley sections being determined by the total number of V-grooves to receive V-belts required in a particular installation.

While the width of the V-grooves at the left-hand side of the central pulley section is reduced in moving from the pulley section positions shown in FIG. 1, to those shown in FIG. 2, and the width of the V-grooves at the right-hand side of the central pulley section increased from the position shown in FIG. 1 to those shown in FIG. 2, this arrangement can be reversed by reversing the pulley sections which are attached to the first and second pairs of hub sections respectively.

The diameter of each of the pulley sections shown in FIGS. 1 and 2 may be increased or decreased from those shown in FIGS. 1 and 2, the maximum diameter being determined by the maximum diameter of pulley section which can be supported by a given size of hub section, and would usually be limited to approximately nine or ten inches. The minimum diameter of the pulley sections would be limited by a pulley section which can be supported by a given diameter of flange of a particular hub section diameter. This diameter would normally be limited to about 2½ inches, but this could be reduced depending upon the diameter of the flanges of a particular pair of hub sections.

The steps between the diameters of individual pulley sections attached to each pair of hub sections would be controlled by the radial distance between the V-belt position from the outer position such as V-belt 52, as shown at the left-hand side of FIG. 2, to the smaller diameter position shown in FIG. 1, or the difference between the outer V-belt position, such as that shown at the right-hand side of FIG. 1, to the reduced diameter position of the same V-belts, as shown in FIG. 2.

These steps would provide a complete range of pulley V-groove diameters, ranging from the minimum diameter of pulley section in each set of replacement pulley sections to the maximum diameter pulley sections.

The replacement of the pulley sections themselves would provide the larger steps in this range, the movement of the V-belt position as controlled by the control mechanism shown in FIG. 1, controlling the range of movement of the selected set of pulley sections attached to the two pairs of hub sections in a particular installation.

It will be apparent to those skilled in the art that my present invention is not limited to the specific details described above and shown in drawings, and that various modifications are possible in carrying out the features of the invention and the operation, actuation, attachment, adjustment and the method of utilization thereof, without departing from spirit and scope of the appended claims.

What I claim is:

1. An adjustable V-belt pulley mechanism comprising a substantially cylindrical central shaft, a first diametrically opposite pair of hub sections slidably and rotatably supported by the central shaft, a second pair of pulley hub sections, radially angularly positioned relative to the first pair of hub sections, rotatably and slidably supported by the central shaft, a plurality of pairs of circular pulley sections mounted on the hub sections, one pulley section of each pair having a sloping frusto-conical surface on one face thereof, the adjoining pulley section of each pair having a sloping frusto-conical surface around the face thereof directed toward the first pulley section, the frusto-conical face sloping in a direction opposite that of the mating pulley section of each pair, means removably attaching the first pulley section of each pair to the first pair of hub sections, means removably attaching the second pulley section of each pair to the second pair of hub sections, a control mechanism mounted adjacent one end of the pulley sections, a portion of said control mechanism being fixedly attached to the first pair of hub sections, another portion of the control mechanism being fixedly attached to the second pair of pulley hub sections, the mating frusto-conical surfaces of each pair of pulley sections forming a V-belt groove therebetween, said control mechanism being operative to longitudinally move one pair of hub sections and the pulley sections attached thereto, in one direction, the control mechanism being operative to simultaneously move the second pair of pulley hub sections and the pulley sections attached thereto in the opposite direction, the pulley sections attached to the first pair of hub sections being selectively moved toward and away from the pulley sections attached to the second pair of hub sections, to selectively increase and decrease the width of the V-belt grooves therebetween, the center of each V-belt groove remaining substantially constant, regardless of the momentary adjusted width of the V-belt groove between each pair of pulley sections, each pulley support hub section of the first diametrically opposite pair of hub sections having a flange in the form of a circular sector integral therewith, each hub section of the second pair of diametrically opposite hub sections having a corresponding flange in the form of a circular sector, integral therewith, the flanges of each diametrically opposite pair of hub sections being located in one plane, the plane being substantially perpendicular to the central shaft.

2. An adjustable V-belt pulley mechanism, as in claim 1, in which the flange of each hub section being substantially perpendicular to the longitudinal axis of the central shaft, the flange of each hub section flush with the adjacent face of the pulley section supported by each pair of hub sections, each of the pulley sections having a substantially circular counterbore therein, the counterbore of each pulley section being adapted to clear and receive the flanges of each pair of hub sections engaging the bottom surface of the counterbore of the pulley section supported by the pair of hub sections, and means inserted through each pulley section and the corresponding flanges of the pulley support hub sections operative to clamp each pulley section to the corresponding pair of hub sections.

3. An adjustable V-belt pulley mechanism, as in claim 1, in which each pulley support hub section of the first diametrically opposite pair of hub sections has a flange in the form of a circular sector integral therewith, the flanges of each diametrically opposite pair of hub sections being located in one plane, the plane being substantially perpendicular to the longitudinal axis of the central shaft, the included angle between the edges of the flange of each hub section of the first pair of hub sections being substantially equal to the included angle between the edges of the flange of each hub section of the second pair of hub sections, the flanges of each pair of hub sections flush with the adjacent face of the pulley section supported by each pair of hub sections, and means inserted through each pulley section and the corresponding flanges of the pulley support hub sections operative to clamp each pulley section to the corresponding pair of hub sections.

4. An adjustable V-belt pulley mechanism, as in claim 1, in which the included angle between the edges of the flange of each hub section of the first pair of hub sections being substantially equal to the included angle between the edges of the flange of each hub section of the second pair of hub sections, each of the pulley sections having a substantially circular counterbore therein, the counterbore of each pulley section being adapted to clear and receive the flanges of the pair of hub sections supporting the pulley section, the flanges of each pair of hub sections engaging the bottom surface of the counterbore of the pulley section supported by the pair of hub sections, and means inserted through each pulley section and the corresponding flanges of the adjacent pulley support hub sections operative to clamp each pulley section to the corresponding pair of hub sections.

5. An adjustable V-belt pulley combination as in claim 1, in which each pulley support hub section of the first diametrically opposite pair of hub sections has a flange in the form of a circular sector integral therewith, each hub section of the second pair of diametrically opposite hub sections having a corresponding flange in the form of a circular sector, integral therewith, the flanges of each diametrically opposite pair of hub sections being located in one plane, the plane of the flanges being substantially perpendicular to the longitudinal axis of the central shaft, the included angle between the edges of the flange of each hub section of the first pair of hub sections being substantially equal to the included angle between the edges of the flange of each hub section of the second pair of hub sections, each of the pulley sections having a substantially circular counterbore through one face thereof, the counterbore through each pulley section being adapted to clear and receive the flanges of the pair of hub sections supporting the pulley section, the flanges of each pair of hub sections engaging the bottom surface of the counterbore of the pulley section supported by the pair of hub sections, the wall of each pulley section adjacent the bottom surface of the counterbore through each pulley section having a pair of cutouts in the form of substantially circular sectors, therethrough, the cutouts through each pulley section being adapted to clear the flanges of one diametrically opposite pair of hub sections, to allow each pulley section to be moved longitudinally over the flanges of the pair of hub sections, and means inserted through each pulley section and the corresponding flanges of the adjacent pulley support hub sections operative to clamp each pulley section to the corresponding pair of hub sections.

6. An adjustable V-belt pulley combination as in claim 1, in which each pulley support hub section of the first diametrically opposite pair of hub sections has a flange in the form of a substantially circular sector integral therewith, each hub section of the second pair of diametrically opposite hub sections having a corresponding flange in the form of a substantially circular sector integral therewith, the flanges of each diametrically opposite pair of hub sections being located in one plane, the plane of the flanges being substantially perpendicular to the longitudinal axis of the central shaft, the included angle between the sides of the flange of each hub section of the first pair of hub sections being substantially equal to the included angle between the sides of the flange of each hub section of the second pair of hub sections, each of the pulley sections having a substantially circular counterbore through one face thereof, the counterbore through each pulley section being adapted to clear and receive the flanges of the pair of hub sections supporting the pulley section, the flanges of each pair of hub sections engaging the bottom surface of the counterbore of the pulley section supported by the pair of hub sections, the wall of each pulley section adjacent the bottom surface of the counterbore through each pulley section having diametrically aligned cutouts in the form of circular sectors therethrough, the cutouts through each pulley section being adapted to clear the flanges of one diametrically opposite pair of hub sections, to allow each pulley section to be moved longitudinally over the flanges of one pair of hub sections, each pulley section having a plurality of openings through the portion of the wall of the pulley section abutting the flanges of the mating hub sections, the flanges of the hub sections supporting each pulley section having a plurality of openings therethrough, the openings being axially aligned with the mating openings through the pulley section, and means inserted through the aligned openings in each pulley section and the mating flanges of the hub sections operative to removably clamp each pulley section to the corresponding pair of hub sections.

7. An adjustable V-belt pulley combination, as in claim 1, in which each pulley support hub of the first diametrically opposite pair of hub sections has a flange in the form of a substantially circular sector integral therewith, each hub section of the second pair of diametrically opposite hub sections having a corresponding flange in the form of a substantially circular sector integral therewith, the flanges of each diametrically opposite pair of hub sections being located in one plane, the plane of the flanges being substantially perpendicular to the longitudinal axis of the central shaft, the included angle between the sides of the flange of each hub section of the first pair of hub sections being substantially equal to the included angle between the sides of the flange of each hub section of the second pair of hub sections, each of the pulley sections having a substantially circular counterbore through one face thereof, the counterbore being adapted to clear and receive the flanges of the pair of hub sections supporting the pulley section, the flanges of each pair of hub sections engaging the bottom surface of the counterbore of the pulley section supported by the pair of hub sections, the wall of each pulley section adjacent the bottom surface of the counterbore through each pulley section having diametrically aligned cutouts in the form of substantially circular sectors therethrough, the cutouts through each pulley section being adapted to clear the flanges of the diametrically opposite pair of hub sections, to allow each pulley section to be moved longitudinally over the flanges of one pair of hub sections, each pulley section having a plurality of openings through the portion of the wall of the pulley section abutting the flanges of the mating hub sections, the flanges of the hub sections supporting each pulley section having a plurality of openings therethrough, the openings being axially aligned with the mating openings through the pulley section, and a tubular internally threaded dowel bushing inserted through aligned openings through each pulley section, and the mating flange of the hub section, and a headed screw threadably fitted to the tubular dowel bushing, the dowel bushing and the threaded screw being adapted to removably clamp the pulley section to the hub sections supporting it.

8. An adjustable V-belt pulley mechanism comprising a substantially cylindrical central shaft, a first diametrically opposite pair of hub sections slidably supported by the central shaft, a second diametrically opposite pair of pulley hub sections, radially angularly positioned relative to the first pair of hub sections rotatably and slidably supported by the central shaft, a plurality of pairs of circular pulley sections mounted on the hub sections, one pulley section of each pair having a sloping frusto-conical surface on one face thereof, the adjoining pulley section of each pair having a sloping frusto-conical surface around the face thereof directed toward the first pulley section, the frusto-conical surface sloping in a direction opposite that of the mating pulley section of each pair, a central pulley section mounted between two individual pulley sections, the central pulley section having sloping frusto-conical surfaces on both surfaces thereof, the frusto-conical surfaces sloping in opposite directions, means removably attaching the first pulley section of each pair to the first pair of hub sections, means removably attaching the central pulley section to the second pair of hub sections, a control mechanism mounted adjacent one end of the pulley hub sections, a portion of said control mechanism being fixedly attached to the first pair of hub sections, another portion of the control mechanism being fixedly attached to the second pair of pulley hub sections, the mating frusto-conical surfaces of each pair of pulley sections forming a V-belt groove therebetween, the opposite frusto-conical faces of the central pulley section, and the frusto-conical face of each adjoining individual pulley section forming a V-belt groove adjacent each face of the central pulley section, said control mechanism being operative to longitudinally move one pair of hub sections and the pulley sections attached thereto, in one direction, the second pair of hub sections being operative to simultaneously move the central pulley section toward the individual pulley section located adjacent one face of the central pulley section and away from the individual pulley section located adjacent the opposite face of the central pulley section, the pulley sections attached to the first pair of hub sections being selectively moved toward and away from the pulley sections attached to the second pair of hub sections, to selectively increase and decrease the width of the V-belt groove therebetween, the V-belt grooves located adjacent both faces of the central pulley section being simultaneously selectively increased and decreased to the same extent as the V-belt groove between each pair of individual pulley sections, the center of each V-belt groove remaining substantially constant, regardless of the momentary adjusted width of the V-belt groove between each pair of pulley sections, each pulley support hub section of the first diametrically opposite pair of hub sections having a flange in the form of a substantially circular sector integral therewith, each hub section of the second pair of diametrically opposite hub sections having a corresponding flange in the form of a substantially circular sector integral therewith, the flanges of each diametrically opposite pair of hub sections being located in one plane, the plane of the flanges being substantially perpendicular to the longitudinal axis of the central shaft.

9. In combination with a V-belt pulley mechanism, as in claim 8, a tubular hub support member rotatably fitted to the central shaft, the tubular hub support member being inserted between the central shaft and the circumferential inner surface of the first and second pairs of hub sections, a plurality of longitudinally extending keys inserted in the circumferential outer surface of the tubular hub support member and the adjacent inner surface of the first pair of hub sections, a plurality of longitudinally extending keys inserted in the circumferential outer surface of the tubular hub support member and the adjacent inner surfaces of the second pair of hub sections, said keys being operative to permit longitudinal sliding movement of the first and second pairs of hub sections relative to the tubular hub support member, while causing the tubular hub support member to rotate with the first and second pairs of hub sections, when the hub sections are rotated with the pulley sections attached thereto.

10. In combination with a V-belt pulley mechanism, as in claim 8, a tubular hub support member rotatably fitted to the central shaft, the tubular hub support member being inserted between the central shaft and the circumferential inner surfaces of the first and second pairs of hub sections, a plurality of longitudinally extending keys inserted in the circumferential outer surface of the tubular hub support member and the adjacent inner surfaces of the first pair of support hub sections, a plurality of longitudinally extending keys inserted in the circumferential outer surface of the tubular hub support member and the adjacent inner surfaces of the second pair of hub sections, said keys being operative to permit longitudinally sliding movement of the first and second pairs of hub sections relative to the tubular hub support member, while causing the tubular hub support member to rotate with the first and second pairs of hub sections, when the hub sections are rotated by the pulley sections attached thereto.

11. An adjustable V-belt pulley combination as in claim 8, in which the included angle between the edges of the flange of each hub section of the first pair of hub sections being substantially equal to the included angle between the edges of the flange of each hub section of the second pair of hub sections, each of the pulley sections having a substantially circular counterbore through one face thereof, the counterbore through each pulley section being adapted to clear and receive the flanges of the pair of hub sections supporting the pulley section, the flanges of each pair of hub sections engaging the bottom surface of the counterbore of the pulley section supported thereby, the central pulley section having a substantially circular counterbore through one face thereof, the counterbore being adapted to clear and receive the flanges of the pair of hub sections supporting the central pulley section, the flanges of the hub sections engaging the bottom surface of the counterbore of the central pulley section, the wall of each pulley section adjacent the bottom surface of the counterbore through each pulley section having a pair of cutouts in the form of diametrically aligned circular sectors therethrough, the cutouts through each pulley section being adapted to clear the flanges of one diametrically opposite pair of hub sections, to allow each pulley section to be moved longitudinally over the flanges of one pair of hub sections, each pulley section, including the central pulley section, having a plurality of openings through the portion of the wall of the pulley section abutting the flanges of the mating pair of hub sections, the flanges of the pair of hub sections supporting each pulley section having a plurality of openings therethrough, the openings being axially aligned with the mating openings through the pulley section, and clamping means inserted through aligned openings through each pulley section and the mating flanges of the hub section, the clamping means being adapted to clamp the mating pulley section to the hub section supporting it.

12. An adjustable V-belt pulley mechanism as in claim 8, in which the included angle between the edges of the flange of each hub section of the first pair of hub sections being substantially equal to the included angle between the edges of the flange of each hub section of the second pair of hub sections, each of the pulley sections having a substantially circular counterbore therein, the counterbore of each pulley section being adapted to clear and receive the flanges of the pair of hub sections supporting the pulley section, the flanges of each pair of hub sections engaging the bottom surface of the counterbore of the pulley section supported by the pair of hub sections, the central pulley section having a substantially circular counterbore through one face thereof, the counterbore being adapted to clear and receive the flanges of the pair of hub sections supporting the central pulley section, the flanges of the hub sections supporting the central pulley section engaging the bottom surface of the counterbore of the central pulley section, the wall of each pulley section adjacent the bottom surface of the counterbore through each pulley section having a pair of cutouts in the form of diametrically aligned circular sectors therethrough, the cutouts through each pulley section being adapted to clear the flanges of one diametrically opposite pair of hub sections, to allow each pulley section to move longitudinally over the flanges of one pair of hub sections, each pulley section, including the central pulley section, having a plurality of openings, through the portion of the wall of the pulley section abutting the flanges of the mating pair of hub sections, the flanges of the pair of hub sections supporting each pulley section having a plurality of substantially circular openings therethrough, the openings being axially aligned with the mating openings through the pulley section, and a tubular internally threaded headed dowel bushing inserted through aligned openings through each pulley section and the mating flanges of the hub sections, and a headed screw threadably fitted to each tubular dowel bushing, the headed screw and the headed dowel bushing being adapted to removably clamp the pulley section to the hub sections supporting it.

References Cited in the file of this patent

UNITED STATES PATENTS

| | | |
|---|---|---|
| 1,270,533 | Lombard | June 25, 1918 |
| 2,151,189 | Coddington | Mar. 21, 1939 |
| 2,953,033 | Hall | Sept. 20, 1960 |